US006950625B2

(12) United States Patent  (10) Patent No.: US 6,950,625 B2
Regulinski et al.  (45) Date of Patent:  Sep. 27, 2005

(54) COMMUNICATIONS APPARATUS AND METHOD

(75) Inventors: Paul Lucian Regulinski, London (GB); Govindan Vishnu Nampoothiri, Isleworth (GB); Patrick Chomet, London (GB)

(73) Assignee: ICO Services Limited, Uxbridge (GB)

( * ) Notice: Subject to any disclaimer, the term of this patent is extended or adjusted under 35 U.S.C. 154(b) by 573 days.

(21) Appl. No.: 09/835,066

(22) Filed: Apr. 16, 2001

(65) Prior Publication Data

US 2002/0146979 A1 Oct. 10, 2002

(30) Foreign Application Priority Data

Feb. 12, 2001 (EP) .......................................... 01301226
Apr. 4, 2001 (GB) .......................................... 0108501

(51) Int. Cl.⁷ .............................................. H04B 7/85
(52) U.S. Cl. .................... 455/13.1; 455/427; 455/430; 455/446
(58) Field of Search .............................. 455/12.1, 13.1, 455/179.1, 421, 426.1, 430, 432.1, 436, 447, 448, 454, 456.1

(56) References Cited

U.S. PATENT DOCUMENTS

| 5,073,900 A | * | 12/1991 | Mallinckrodt ................ 370/320 |
| 5,327,572 A | * | 7/1994 | Freeburg ..................... 455/430 |
| 5,452,471 A | * | 9/1995 | Leopold et al. ............. 455/429 |
| 5,584,046 A | * | 12/1996 | Martinez et al. ........... 455/13.1 |
| 6,208,834 B1 | * | 3/2001 | Tawil et al. ................ 455/3.02 |
| 6,370,126 B1 | * | 4/2002 | De Baere et al. .......... 370/316 |
| 2002/0090942 A1 | * | 7/2002 | Karabinis et al. .......... 455/427 |

FOREIGN PATENT DOCUMENTS

| EP | 0597225 A1 | 5/1994 |
| WO | WO 95/27381 | 10/1995 |
| WO | WO 97/26717 | 7/1997 |

* cited by examiner

Primary Examiner—William Trost
(74) Attorney, Agent, or Firm—Michael J. Donohue; Davis Wright Tremaine LLP

(57) ABSTRACT

A method of reusing frequency bands between base stations of a terrestrial mobile communications network and a satellite communications network, comprising allocating the frequency bands using integrated resource management and other mitigation techniques in a such a way as to minimize interference between both the systems, thus making optimum usage of valuable frequency spectrum.

31 Claims, 9 Drawing Sheets

Frequency Bands

| Satellite Uplink Freq Band | | Satellite Dnlink Freq Band | |
|---|---|---|---|
| | | Terrestrial Dnlink Freq Band | Terrestrial Uplink Freq Band |

*Fig. 6*

Frequency Bands

| Satellite Uplink Freq Band | Satellite Dnlink Freq Band |
|---|---|
| Terrestrial Uplink Freq Band | Terrestrial Dnlink Freq Band |

*Fig. 7*

Frequency Bands

| Satellite Uplink Freq Band | | Satellite Dnlink Freq Band |

| Terrestrial Dnlink Freq Band | | Terrestrial Uplink Freq Band |

*Fig. 9*

Frequency Bands

| Satellite Uplink Freq Band | | Satellite Dnlink Freq Band |

| Terrestrial Dnlink Freq Band | Terrestrial Uplink Freq Band |

*Fig. 10*

COMMUNICATIONS APPARATUS AND METHOD

FIELD OF THE INVENTION

This invention relates to communications with a mobile user, and particularly to such communications in which links to mobile users are via a satellite or satellites, and also a relay station of a terrestrial network.

BACKGROUND OF THE INVENTION

Mobile satellite communication systems (MSSs) providing global coverage are known. One such is the Iridium™ system, others are the ICO™ system the Globalstar System™, and the Teledesic™ system.

Since such systems operate globally (or at least, over a large part of the Earth's surface) they need to use a band of frequencies which are available all round the Earth.

Such MSS systems have inherent limitations in their capability to provide services to users who are indoors and are in dense urban areas. Thus the available frequencies for these systems are wasted in dense urban areas and indoors.

Various Terrestrial mobile communications providing local geographic coverage are know. Known systems include GSM and its variants, CDMA, IS-136 and a variety of others using time division multiple access (TDMA) and code division multiple access (CDMA) techniques.

Code division multiple access is a so-called "spread spectrum" system, in which a given mobile device communicates using a relatively wide band, produced by multiplying the digital signal with a high bit rate ("chip rate") code sequence. Each code sequence defines a separate code channel.

Such systems, even though they are efficient and cost-effective in providing high capacity and coverage indoors and in dense urban areas, are not efficient and cost effective in terms of providing coverage to vast thinly populated rural areas.

Ideally, the satellite and terrestrial communications systems could be allocated completely separately frequency ranges, and they would then not interfere with each other.

Known systems like Iridium™ and Globalstar™ rely on roaming between satellite and terrestrial systems, and use completely different frequency spectrum for accessing the satellite and terrestrial systems. However, roaming between satellite and terrestrial systems would be a waste of valuable spectrum, considering that the spectrum used for Satellite communication system cannot be used in dense urban areas and indoors, while spectrum allocated for terrestrial use is not deployed in rural and ocean areas.

Accordingly, the present invention is designed to increase the possibilities for reusing the same channels (for example frequency channels) between terrestrial and satellite mobile communication systems.

U.S. Pat. No. 5,394,561 discloses a mechanism for networking satellite and terrestrial networks in which the power levels of the satellite and terrestrial communications are controlled so as to minimise co-channel interference.

SUMMARY OF THE INVENTION

In one aspect, the invention provides a communications system comprising a satellite mobile communications network which comprises a plurality of satellites and a plurality of user terminals communicating on satellite uplink and downlink bands; and a terrestrial mobile communications network which comprises a plurality of base stations and a plurality of user terminal communicating on terrestrial uplink and downlink bands; characterised in that at least one of the terrestrial bands at least partly reuses at least one of the satellite bands.

Preferably, an embodiment provides a communication system where the resource management, allocation and planning functions of the satellite and terrestrial systems are linked together in such a way as to allow planned reuse of the spectrum.

In another aspect, the present invention provides a frequency reuse system comprising means for reducing localised reuse of said satellite uplink and/or downlink in regions around one of said base stations.

Where the satellite downlink (typically the mobile link) shares the same frequencies as the land network, dual mode terminals will be able to use the terrestrial network instead of the satellite network, and interference from the satellite downlink into the land network is reduced. Indirectly, interference from the satellite uplink is also reduced since terminals cease to use the satellite service in the absence of downlink.

In another aspect, the present invention provides a frequency reuse system, comprising means for transmitting a control signal to satellite user terminals in regions around one of said base stations to cause said user terminals to reduce (if necessary, to zero) use of said satellite uplink.

In another embodiment, the present invention provides a frequency reuse system, comprising means for transmitting a control signal to satellite user terminals in regions around one of said base stations to cause said user terminals to use channels which are non-interfering with said terrestrial network.

The control signal may be transmitted by the satellite. It may be a modified version of a predetermined common control signal.

In another embodiment, the control signal may be transmitted by the land network. As in the preceding embodiment, where the satellite uplink shares channels with the terrestrial network, interference from the satellite uplink is mitigated. Additionally, in this case, since the user terminal responds to a signal transmitted by the terrestrial network itself, rather than by the satellite as in the previous aspect, use of the shared spectrum on the satellite uplink is only suppressed when the user terminal is actually within range of the terrestrial network.

In another aspect, the invention provides a dual mode user terminal in which the satellite system shares frequencies with the terrestrial system, and in which the user terminal is arranged to detect downlink or uplink transmission on the terrestrial network, and to cease use of the shared part of the satellite spectrum on detection thereof. Again, the terminal may cease transmission on the satellite system, but alternatively it may be switched to a non-interfering satellite channel.

In one particular aspect, the uplink and downlink frequencies of a terrestrial network reuse the same frequencies as the satellite downlink but not the satellite uplink. This has the substantial advantage that no uplink or downlink transmissions from the terrestrial network are received by the satellite; such transmissions from a base station or a large number of terrestrial handsets could be more powerful than the weak signals transmitted by a satellite handset and hence could potentially cause significant interference.

In the reverse direction, the satellite downlink is low power because: firstly, the battery and solar cell power available on the satellite is limited; secondly, the path length travelled is long; and thirdly, satellite terminals typically have higher sensitivity. Thus, the total power in the satellite downlink is low and causes minimal interference.

In a particular preferred embodiment, this aspect of the invention is employed with a satellite using narrowband frequency, or frequency and time, division multiplexing and a terrestrial network employing CDMA. Where only a small number of satellite downlink transmissions are taking place, the effect of these on each CDMA signal is limited since they occupy only a small part of the CDMA spectrum. The interference from the satellite is thus even less intrusive in this embodiment.

This aspect is particularly preferably employed with the first aspect of the invention, in which case because the terrestrial network uses the satellite frequencies in shadowed areas (such as urban areas and indoors), the satellite downlink effect is reduced still further since the satellite signal is frequently shadowed.

In another aspect, the invention provides a satellite system which reuses radio spectrum with a terrestrial communications network, in which the satellite uplink shares spectrum with the terrestrial uplink and the satellite downlink shares spectrum with the terrestrial downlink. In this case, and particularly when this aspect is combined with the first, the satellite uplink causes relatively little interference at the terrestrial handset (and particularly when the terrestrial network uses spread spectrum communication and the satellite uses narrowband frequency division or frequency and time division multiplexing).

Also, in this embodiment or others it is particularly convenient to provide a dual mode user terminal having common elements of the radio frequency transmit and receive circuit, to which a separate terrestrial (for example CDMA) and satellite (for example FDMA/TDMA) decoder and demodulator are coupled.

In another aspect, the invention provides a satellite system which reuses radio spectrum with a terrestrial communications network, in which the uplink and downlink frequencies of the terrestrial network reuse the same frequencies as the satellite uplink but not the satellite downlink.

This is particularly advantageous where data terminal equipment is connected to the mobile terminals, since it is found that typical use of such data terminal equipment is heavily asymmetrical; that is, much more information is downloaded on the downlink (for example as a result of downloading emails, and browsing or downloading files from the Internet) than is transmitted on the uplink (which typically carries only selection and navigation commands). There is therefore spare capacity on the satellite uplink which can be reused for terrestrial communications.

Other aspects and preferred embodiments of the invention are as described or claimed hereafter, with advantages which will be apparent from the following.

BRIEF DESCRIPTION OF THE DRAWINGS

Embodiments of the invention will now be described, by way of example only, with reference to the accompanying drawings, in which:

FIG. 6 shows the frequency allocation in the first embodiment;

FIG. 7 shows the frequency allocation in the second embodiment;

FIG. 9 shows the frequency allocation in the third embodiment;

FIG. 10 shows the frequency allocation in the fourth embodiment; and

DETAILED DESCRIPTION OF THE PREFERRED EMBODIMENTS

First Embodiment

Figure 1:
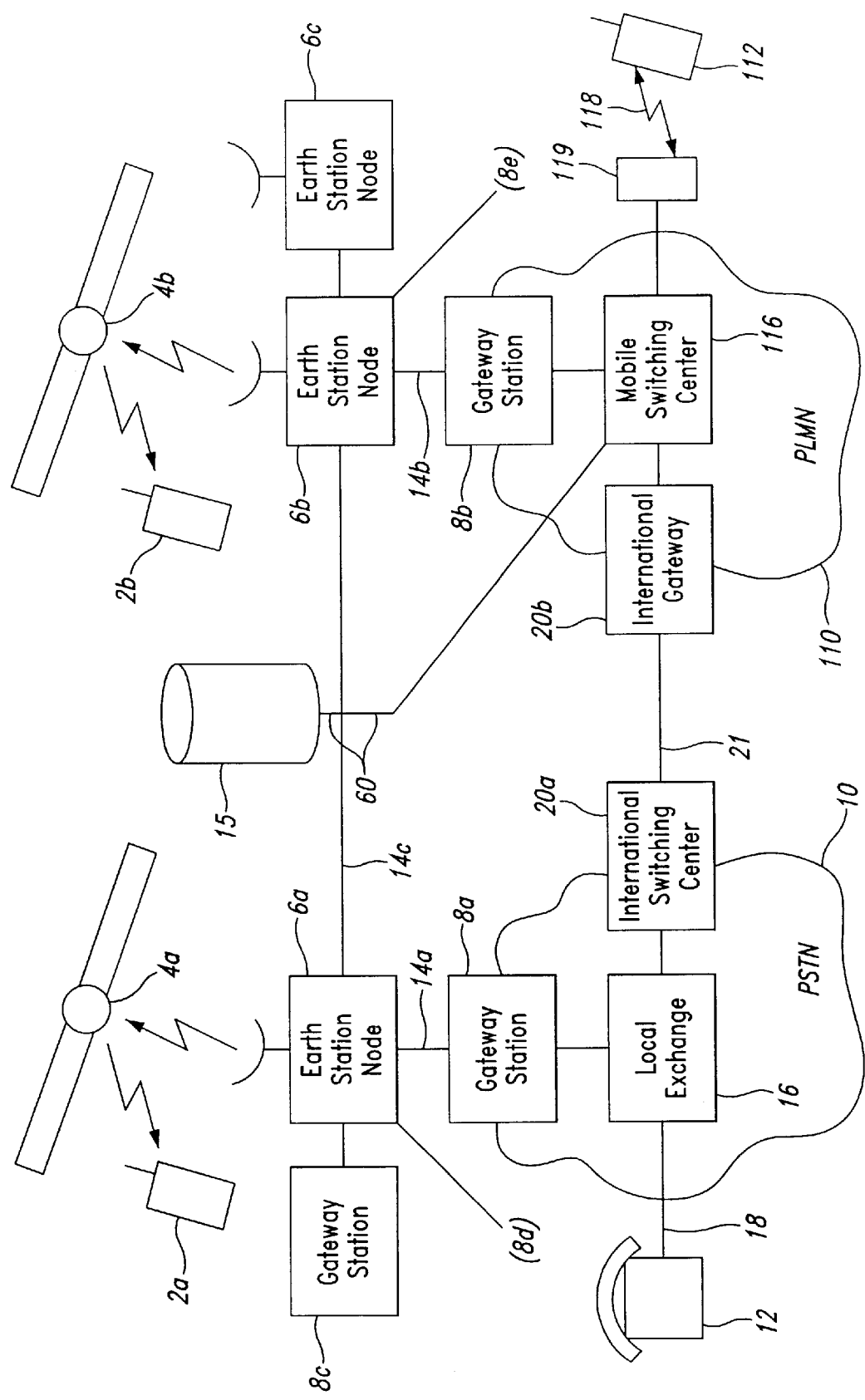
FIG. 1 is a block diagram showing schematically the elements of a first communications system embodying the present invention.

Referring to FIG. 1, a satellite communications network according to this embodiment comprises satellite mobile user terminal equipment 2a, 2b (e.g. handsets 2a and 2b); orbiting relay satellites 4a, 4b; satellite earth station nodes 6a, 6b; satellite system gateway stations 8a, 8b; terrestrial (e.g. public switched) telecommunications networks 10; and fixed telecommunications terminal equipment 12; terrestrial (e.g. public land) mobile telecommunications networks (PLMNs) 110 and terrestrial mobile terminal equipment 112.

Interconnecting the satellite system gateways 8a, 8b with the earth station nodes 6a, 6b, and interconnecting the nodes 6a, 6b with each other, is a dedicated ground-based network comprising channels 14a, 14b, 14c. The satellites 4, earth station nodes 6 and lines 14 make up the infrastructure of the satellite communications network, for communication with the mobile terminals 2, and accessible through the gateway stations 8.

A central database station 15 is connected, via a signalling link 60 (e.g. within the channels 14 of the dedicated network) to the gateway station, earth stations 6, and PLMN 110 (as discussed below).

The PSTNs 10 comprise, typically, local exchanges 16 . . . to which the fixed terminal equipment 12 . . . is connected via local loops 18; and international switching centres 20 . . . connectable one to another via national and transnational links 21 (for example, satellite links or subsea optical fibre cable links). The PSTNs 10 and fixed terminal equipment 12 (e.g. telephone instruments) are well known and almost universally available today.

The PLMNs 110 comprise, typically, mobile switching centres (MSCs) 116 to which the terrestrial mobile terminals 112 are connected via local radio paths 118 and base stations 119; and international gateways 20b.

In this embodiment, most or all of the satellite user terminals 2 are dual mode and hence are also connectable via the terrestrial base stations 119.

For voice communications via the satellite network, each satellite mobile terminal apparatus 2 is in communication with a satellite 4 via a full duplex channel (in this embodiment) comprising a downlink (to-mobile) channel and an uplink (from-mobile) channel, for example (in each case) a TDMA time slot on a particular frequency allocated on initiation of a call, as disclosed in UK patent applications GB 2288913 and GB 2293725. The satellites 4 in this embodiment are non geostationary, and thus, periodically, there is handover of the user terminal from one satellite 4 to another.

For voice communications via the PLMN, each mobile terminal apparatus 2, 112 is in communication with a mobile switching centre 116 via a base station 119 using an uplink frequency band and a downlink frequency band.

Mobile Terminal 2

Figure 2A:
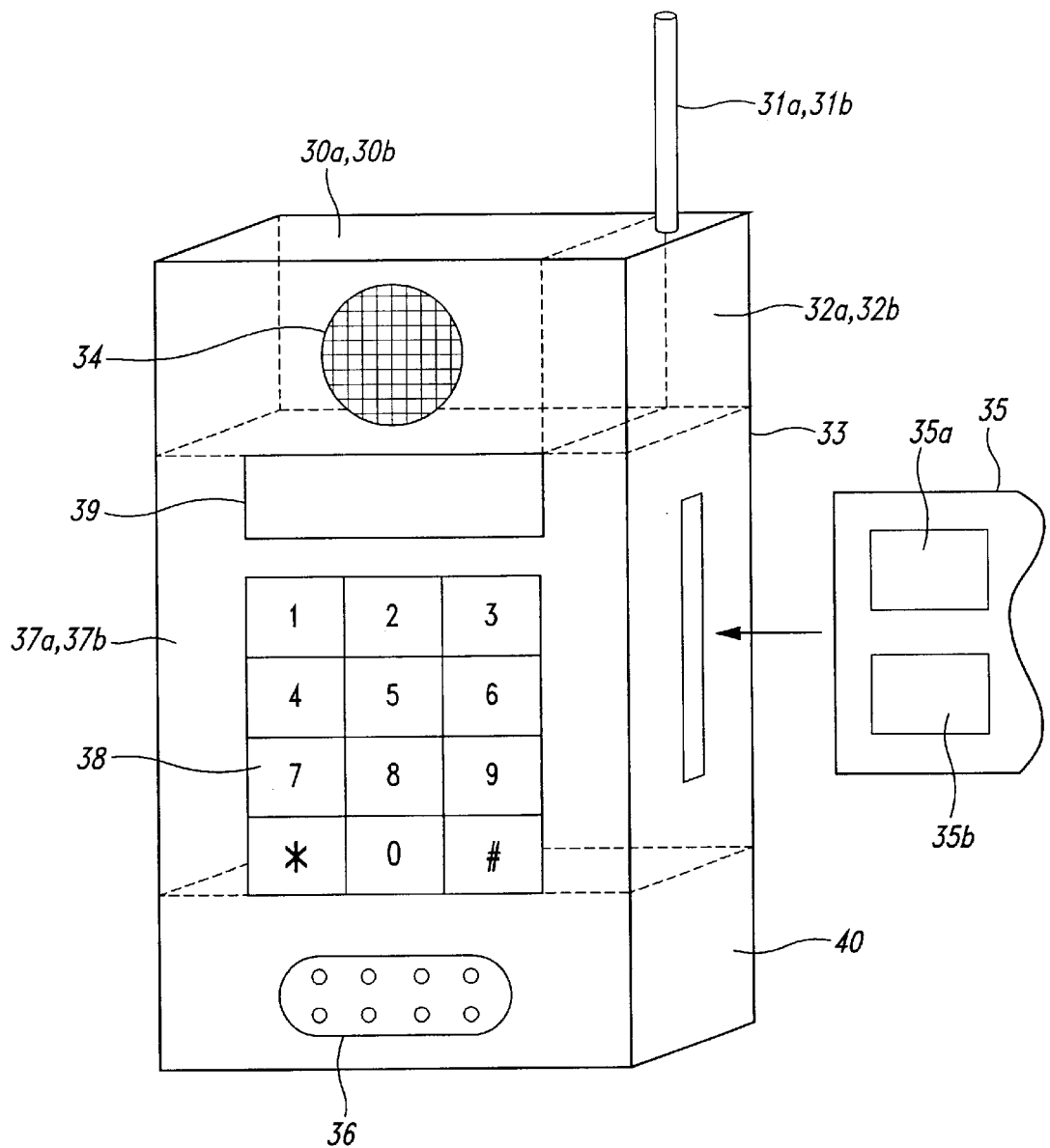
FIG. 2a is an illustrative diagram showing schematically the elements of mobile terminal equipment suitable for use with the present invention.
Figure 2B:
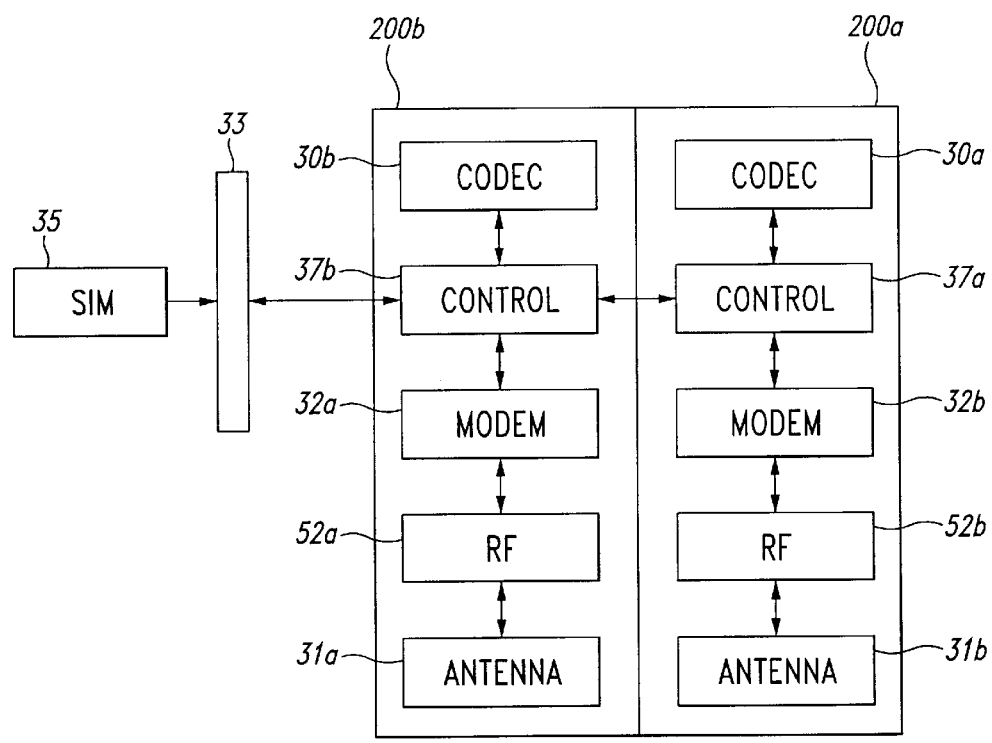
FIG. 2b is a corresponding block diagram.

Referring to FIGS. 2a and 2b, a dual mode mobile terminal handset equipment 2a of FIG. 1 is shown.

It comprises a combination of a satellite handset, similar to those presently available for use with the GSM system, and a terrestrial handset suitable for third generation (3G) CDMA, W-CDMA or CDMA 2000. communications.

The user interface components (microphone 36, loudspeaker 34, display 39 (for example a liquid crystal display) and keypad components 38) and power supply (battery 40) are shared, i.e. used in both modes.

Apart from such common components (omitted for clarity from FIG. 2b), the terminal comprises a CDMA functional unit 200a and a satellite functional unit 200b. Each comprises a digital coder/decoder 30a, 30b; modem 32a, 32b; control circuit 37a, 37b; radio frequency (RF) interface 32a and 32b, and antennas 31a and 31b, suitable for satellite and terrestrial mobile communications respectively. The satellite antenna 31a has some gain in directions above the horizon (it may be a Quadrifilar Helix or QFH antenna). The terrestrial antenna 31b is roughly omnidirectional.

A 'smart card' reader 33 receiving a smart card (subscriber identity module or SIM) 35 storing user information are also provided, connected to communicate with the satellite control circuit 37b. Specifically, the SIM 35 includes a processor 35a and permanent memory 35b.

The control circuits 37a, 37b (in practice integrated with the respective codec 30) consist of a suitably programmed microprocessor, microcontroller or digital signal processor (DSP) chip. Each control circuit 37 performs various functions including framing speech and data into TDMA time frames for transmission (and likewise demultiplexing received TDMA frames) or CDMA sequences respectively; and performing encryption or enciphering.

Separate chipsets may be provided, each for implementing one of the terrestrial and satellite system functionalities 200a, 200b. Alternatively, a single processor may be programmed to perform the coding and control for both functionalities. In each case, in this embodiment separate RF components are provided, but user interface components are shared.

The mobile phone will then operate either as a satellite telephone or as terrestrial phone, with the relevant functional unit 200a or 200b working substantially independently and as it would do in a single mode phone.

The coder/decoder (codec) 30a, 30b this embodiment comprise a coder, generating a speech bit stream at around 3.6 kilobits per second, together with a channel coder 30b applying error correcting encoding, to generate an encoded bit stream, and corresponding decoders.

In this embodiment the modems can support data rates of up to 384 kbps also.

A single mode satellite handset 2 would be as described, but lacking the section 200b; and a terrestrial handset 112 is as described but lacking section 200a.

Earth Station Node 6

The earth station nodes 6 are arranged for communication with the satellites.

The Earth stations 6 are positioned dispersed about the Earth such that for any orbital position, at least one Earth station 6 is in view of a satellite 4.

Figure 3:
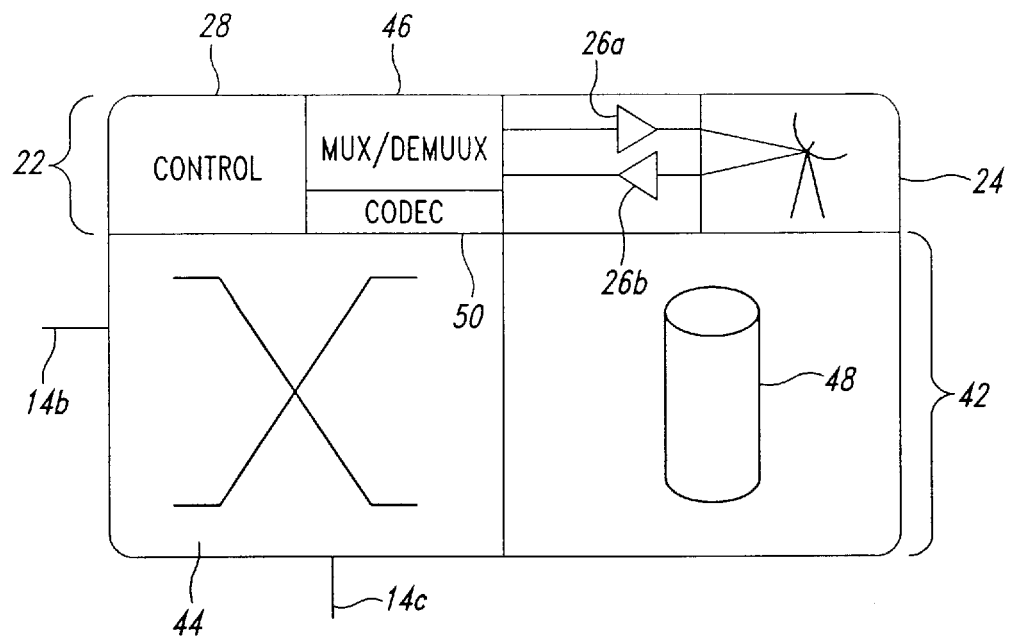
FIG. 3 is a block diagram showing schematically the elements of an Earth station node forming part of the embodiment of FIG. 1.

Each earth station node 6 comprises, as shown in FIG. 3, a conventional satellite earth station 22 consisting of at least one satellite tracking antenna 24 arranged to track at least one satellite 4, RF power amplifiers 26a for supplying a signal to the antenna 24, and 26b for receiving a signal from the antenna 24; and a control unit 28 for storing the satellite ephemera data, controlling the steering of the antenna 24, and effecting any control of the satellite 4 that may be required (by signalling via the antenna 24 to the satellite 4).

The earth station node 6 further comprises a mobile satellite switching centre 42 comprising a network switch 44 connected to the trunk links 14 forming part of the dedicated network. A multiplexer 46 is arranged to receive switched calls from the switch 44 and multiplex them into a composite signal for supply to the amplifier 26 via a low bit-rate voice codec 50. Finally, the earth station node 6 comprises a local store 48 storing details of each mobile terminal equipment 2a within the area served by the satellite 4 with which the node 6 is in communication.

Gateway 8

The gateway stations 8a, 8b comprise, in this embodiment, commercially available mobile switch centres (MSCs) of the type used in digital mobile cellular radio systems such as GSM systems.

The gateway stations 8 comprise a switch arranged to interconnect incoming PSTN lines from the PSTN 10 with dedicated service lines 14 connected to one or more Earth station nodes 6.

Database Station 15

The database station 15 comprises a digital data store, a signalling circuit, a processor interconnected with the signalling circuit and the store, and a signalling link 60 interconnecting the database station 15 with the gateway stations 8 and Earth stations 6 making up satellite system network, for signalling or data message communications.

It stores data for terminal apparatus 2, for example position data, billing data, authentication data and so on, like the Home Location Register (HLR) of a GSM system.

Thus, in this embodiment the database station 15 acts to fulfil the functions of a home location register (HLR) of a GSM system, and may be based on commercially available GSM products.

Periodically, the Earth station nodes measure the delay and Doppler shift of communications from the terminals 2 and calculate the rough terrestrial position of the mobile terminal apparatus 2 using the differential arrival times and/or Doppler shifts in the received signal. The position is then stored in the database 48.

The database station 15 in this embodiment also performs frequency planning, to determine the frequencies to be used for communicating via the satellites 4 with each of the satellite user terminals 2, and to control the use of uplink and downlink frequencies thereby as further discussed below. The database station 15 is accordingly connected additionally with the radio spectrum allocation components of the PLMN 110 via the signalling link 60; it can thereby communicate with the Mobile Switching Centre (eMSC) or Base Station Control centre which controls the frequencies used by the base stations 119b of the PLMN.

Periodically, the database station 15 transmits frequency allocation information to the Earth stations 6 for use in the satellites 4, and PLMNs 110.

Satellites 4

Figure 4A:
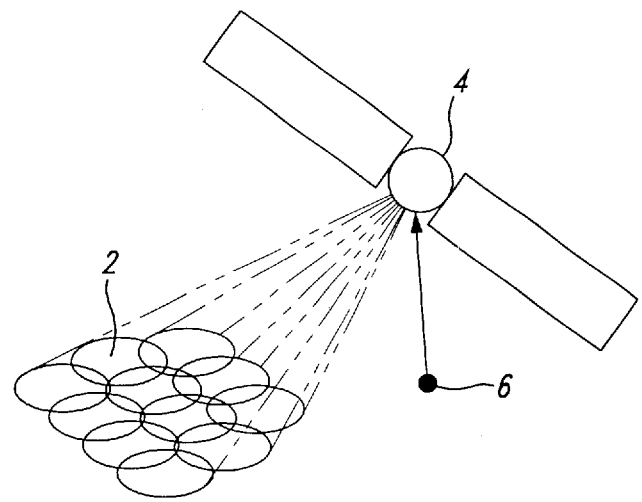
FIG. 4a illustrates schematically the beams produced by a satellite in the embodiment of FIG. 1.

The satellites 4a, 4b comprise generally conventional communications satellite buses such as the HS601 available from Hughes Aerospace Corp, California, US, and the payload may be as disclosed in GB 2288913. Each satellite 4 is arranged to generate an array of beams covering a footprint beneath the satellite, each beam including a number of different frequency channels and time slots, as described in GB 2293725 and illustrated in FIG. 4a.

On each beam, the satellite therefore transmits a set of downlink frequencies. The downlink frequencies on adjacent beams are different, so as to permit frequency re-use between beams. Each beam therefore acts somewhat in the manner of a cell of a conventional terrestrial cellular system. For example, there may be 61, 121 or 163 beams.

In this embodiment each downlink frequency carries a plurality of time division channels, so that each mobile terminal 2 communicates on a channel comprising a given time slot in a given frequency.

The satellites 4a are arranged in a constellation in sufficient numbers and suitable orbits to cover a substantial area of the globe (preferably to give global coverage).

Figure 4B:
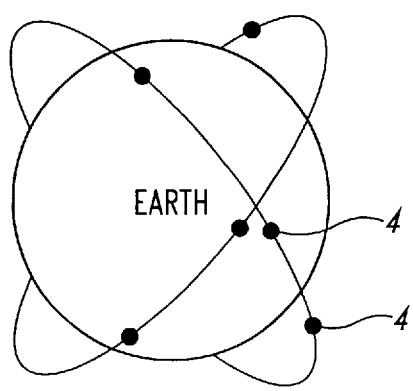
FIG. 4b illustrates schematically the disposition of satellites forming part of FIG. 1 in orbits around the earth.

Referring to FIG. 4b, a global coverage constellation of satellites is provided, consisting of a pair of orbital planes each inclined at 45 degrees to the equatorial plane, spaced apart by 90 degrees around the equatorial plane, each comprising ten pairs of satellites 4a, 4b, (i.e. a total of 20 operational satellites) the pairs being evenly spaced in orbit, with a phase interval of zero degrees between the planes (i.e. a 10/2/0 constellation in Walker notation) at an altitude of about 10,500 km (6 hour orbits).

Thus, neglecting blockages, a UT 2 at any position on Earth can always have a communications path to at least one satellite 4 in orbit ("global coverage").

Base Station 119

The base station 119 comprises a CDMA base station having transmit and receive antennas which are arranged to transmit signals on downlink CDMA channels to mobile terminals, and to receive signals from mobile terminals on uplink CDMA channels. The downlink channels are provided, in this embodiment, in a downlink frequency band and the uplink signals in an uplink frequency band. At the base station 119, there is further provided a conventional demodulator for demodulating the uplink signals to provide digital data and for modulating digital data onto the downlink signals. Each code channel may spread across the entire uplink or downlink spectrum in known fashion.

Figure 5:
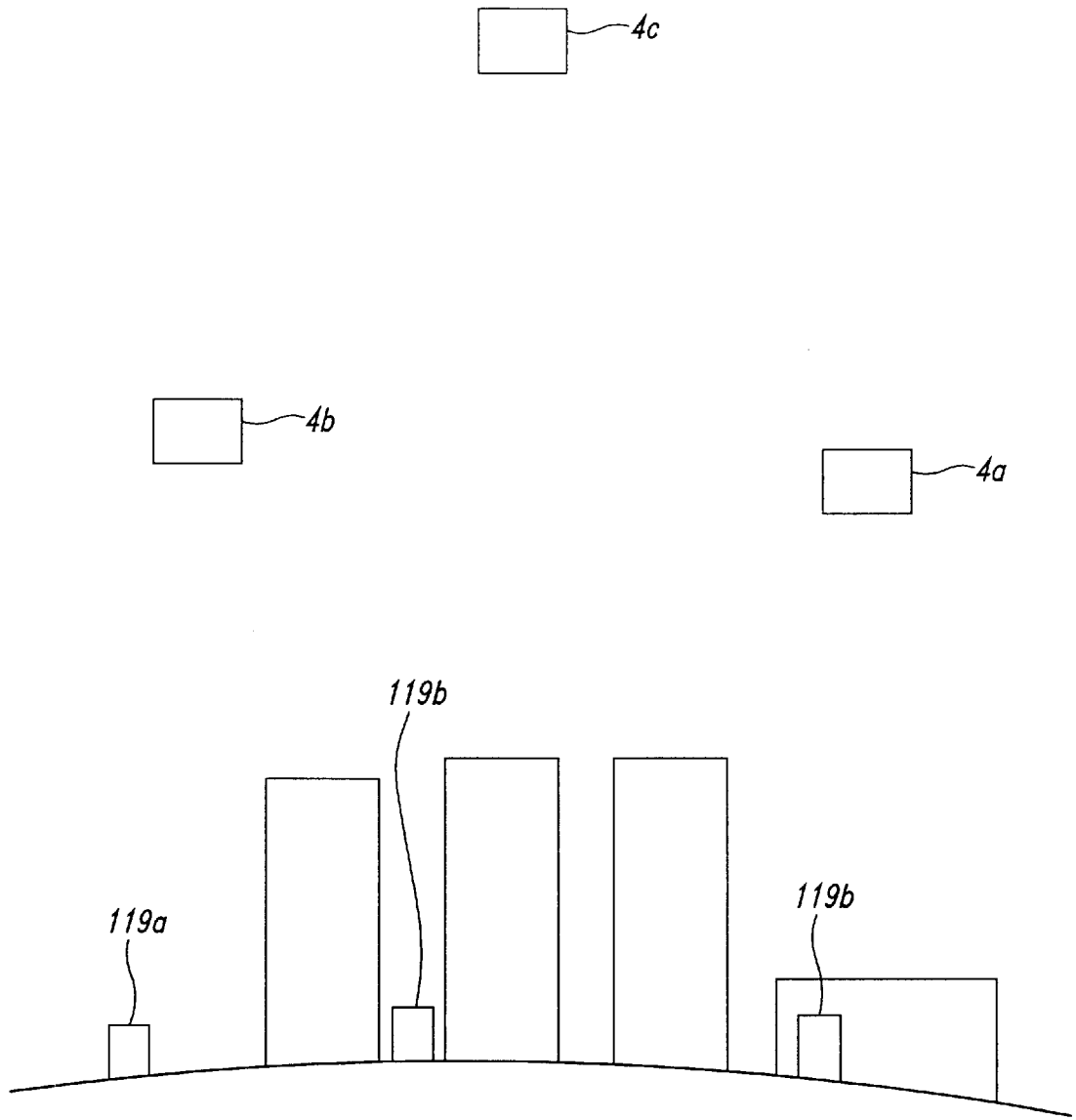
FIG. 5 shows the arrangement of terrestrial base stations in the first embodiment.

Referring to FIG. 5, the base stations 119 of this embodiment comprise first base stations 119a, each of which define a reception cell around it, which are deployed in suburban and rural areas as well as an in urban areas. In such cases, the effective radio coverage of the cell will be of the order of several kilometers or even tens of kilometers, depending upon the line of sight visibility.

This embodiment also provides a second set of base stations 119b which are provided in urban or built up areas. Each defines a "microcell" or "picocell" around it, to provide coverage in heavily shadowed or built up urban areas. For example, within a building such as an airport or a train station, or along an underground railway, a number of such picocell base stations 119b are provided. Cover is therefore provided in areas where the base stations 119a usually cannot communicate and satellites 4 will almost never communicate.

The base stations 119 include base station control circuits which allocate frequencies for communicating with mobile terminals 112.

The transmit and receive antennas at the base stations 119a are generally constrained to broadcast preferentially in the azimuthal plane, for example by using a suitable "apple core" torroidal or conical reflector antenna, or are provided with some other beam shaping or directing means which reduces the gain above the azimuth (i.e. the horizon) so that the beam shaping effectively mitigates the interference to the satellites; the transmit and receive antennas of the terrestrial handsets 112 are generally omnidirectional to permit the handset to be used in any orientation.

Frequency Allocation

FIG. 6 shows the frequency allocations in this embodiment. The feeder link frequencies will not be discussed further in the following embodiments, and the terms "satellite uplink" and "satellite downlink" hereafter will refer to the mobile links.

The satellite uplink bands may be within the 1985–2014 MHz range and the satellite downlink bans within the 2170–2200 MHz band range. These frequencies are generally referred to as S-band frequencies.

It will be seen that the satellite uplink frequency band occupies spectrum not shared by the terrestrial network. Thus, the (relatively powerful) transmission from the terrestrial base stations (and terminals) will not interfere with the (relatively weak) uplink signals received at the satellite from the satellite mobile terminals.

Any non-urban base stations 119a may also have allocated uplink and downlink bands which do not interfere with the satellite uplink or downlink bands. As is conventional in cellular mobile systems, this spectrum is reused in geographically separate cells. In urban areas, there is a requirement for additional capacity since more users are present per square kilometer.

In this embodiment, the additional capacity is provided by reusing the satellite downlink, as shown in FIG. 6, to provide additional terrestrial uplink and downlink bands. In this embodiment, the terrestrial uplink and downlink each occupy the same frequencies but are separated by a frequency space to permit frequency duplex separation within the base stations and the mobile terminals.

These are used by the base stations 119b in microcells and picocells; for the purpose of this embodiment, these are cells located inside buildings or tunnels. (For reasons discussed further below, additional frequencies are present within the satellite downlink band which are not occupied by the additional terrestrial uplink and downlink frequencies.)

In such areas, the satellite downlink is frequently attenuated by ceilings or walls. Since the power radiated by the satellite is relatively low and the path length is relatively long, and the antenna used by a terrestrial user terminal has a relatively low gain (and/or G/T measure) as it is omnidirectional, the level of interference from the satellite into the terrestrial terminal is minimal.

Referring to FIG. 5, in this embodiment one or more of the base stations 119a which are located in urban areas may also make use of the additional frequency bands used by the pico base stations 119b. This is because, as shown in FIG. 5, the level of shadowing by buildings makes communication with satellites 4a, 4b difficult; only on the rare occasions when a satellite 4c is in an unobstructed line of sight to a user terminal will the user terminal be affected by the satellite downlink.

Thus, to sum up, in this embodiment, the frequencies used by the terrestrial base stations 119 are allocated so that in urban or other shadowed areas, the additional terrestrial uplink and downlink bands lying within the satellite downlink band are utilised. The specific frequency channels within the satellite downlink band are reused for uplink and downlink of the terrestrial basestations located in urban and suburban areas.

In this embodiment, as the satellite communicates with each user on a narrow frequency channel, even if communication with a relatively small number of satellite users continues in the urban area, the interference with the terrestrial uplink and downlink frequencies will be minor because, due to the spectrum spreading of CDMA, the interference on one particular frequency is (up to a certain level) absorbed in the CDMA error correction decoding. Thus, small numbers of (inherently low) satellite channels merely slightly raise the noise floor.

Likewise, as the CDMA signals are spread over a wide spectrum, the noise power contributed by the PLMN 110 into any one of the narrow satellite communication frequency channels is low.

In this embodiment, however, the effects of such residual interference are reduced yet further by controlling the broadcast from the satellites 4. The orbits of each of the satellites 4 are characterised to a high degree of accuracy, and their inclinations are actively controlled to maintain their beam directions accurately pointing to Earth. Each of the satellite spot beams has a radius of the order of some tens or hundreds of kilometers. The spot beams of each satellite overlap, and those of one satellite overlap with those of another in the most regions of the Earth and at most times.

In this embodiment, the database station 15 maintains a database recording the positions of base stations 119b using the additional frequency bands which lie within the satellite downlink. The frequencies allocated to a given spot beam (which are dictated by a routing table held within each satellite and periodically reprogrammed from within the data base station 15) are controlled so that the frequencies first allocated (i.e. preferentially allocated when available) are those from the region of the satellite downlink not in use by terrestrial base stations 119. Thus, a number of satellite handsets may be operated without any possibility of interference with the terrestrial network.

As the database station 15 communicates with the PLMNs 110 periodically, it is able to vary the frequency allocations depending on the instantaneous loads (i.e. demand for service) on the terrestrial and satellite networks.

Frequencies are preferentially allocated from opposite ends of the shared frequency band; thus, for example, each time a new satellite communication channel is to be added, the next available frequency down from the high frequency end of the band may be allocated, whereas where additional terrestrial capacity is to be allocated, then frequencies may be allocated from the next available frequency up from the low end of the band.

Where such frequencies are exhausted, the next to be allocated to calls may be those which overlap with the terrestrial uplink band. In this embodiment it is easier to mitigate interference on the terrestrial uplink, since each base station 119b can be provided with sophisticated interference reduction techniques to reduce the effect of such interference.

Finally, the last to be allocated are the frequencies sharing the terrestrial downlink frequency band in any spot beam which covers the area overlying one of the base stations 119b.

When the interference due to the above allocation exceeds a certain limit in such a way that this affects the capacity of the terrestrial network, dynamic reallocation of the uplink and downlink frequencies used by a number of terrestrial stations and the satellite network is performed so that the overall interference is kept to a minimum. For example, the set of frequencies used by one spot beam of the satellite and its neighbours, and/or by one of the base stations and its neighbours, are varied to allocate non-interfering channels to the satellite or the base station or both, exchanging those channels with those of a neighbour.

The control channels of the satellite and/or the base station may reallocate channels used on existing calls, by signalling to the terminals to hand over to a new frequency channel.

Thus, in the preferred arrangement of this embodiment, the satellite downlink signals are selectively controlled to areas of coverage which include base stations 119b which are reusing the satellite downlink frequency, so as to mitigate the interference with the terrestrial system.

Under circumstances where it is impossible to allocate non-interfering spectrum to satellite users, it would be possible for the satellite system to signal terminals to cease use of the satellite network. It might be thought that the loss of satellite capacity would preclude economic operation of a satellite system in this case. However, according to this embodiment it is envisaged that the vast majority of satellite user terminals 2 will be dual mode terminals as illustrated in FIG. 2. Accordingly, in areas where the satellite has shut down service, coverage through the terrestrial base stations 119 will be available.

Second Embodiment

Referring to FIG. 7, in this embodiment, the satellite uplink is reused by the second set of base stations 119b in urban areas as a terrestrial uplink, and the satellite downlink is reused by those base stations as a terrestrial downlink.

As in the preceding embodiment, the interference between the satellite system and the terrestrial system is similarly small because of the blocking and shadowing effects of buildings.

In this embodiment, additional measures are taken to limit the interference from the satellite user terminals into terrestrial base stations (satellite uplink into terrestrial uplinks), by providing that the satellite user terminals detect a signal indicating the possibility of interference, and in response cease to transmit satellite signals on the interfering channels and use non-interfering channels where available.

Figure 8:
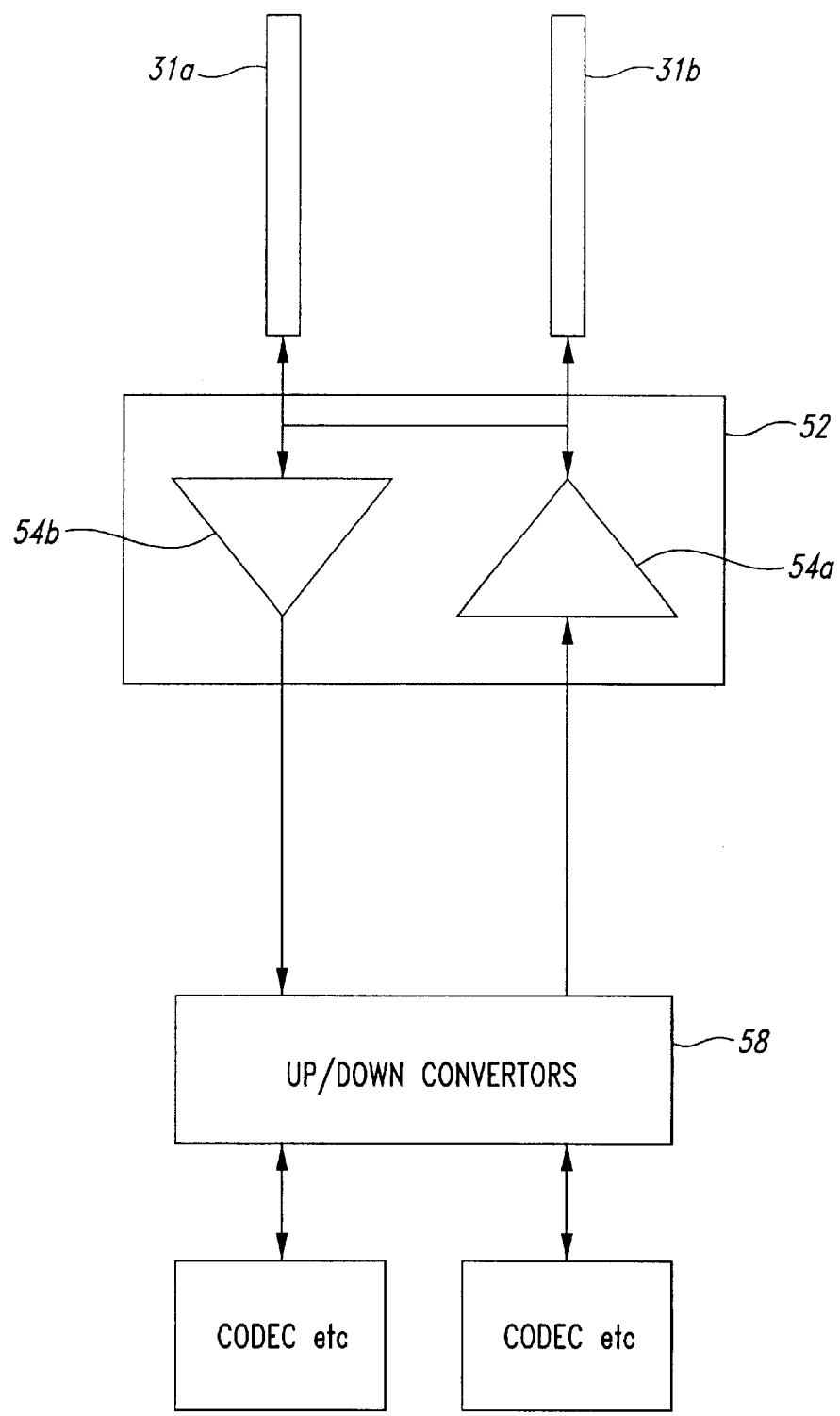
FIG. 8 is a block diagram showing the user terminal of the second embodiment.

Again, in this embodiment, it is envisaged that most of the satellite user terminals are dual mode terminals. Referring to FIG. 8, in this embodiment, as distinct from the preceding embodiment, since the satellite uplink and downlink spectra are the same as the additional terrestrial uplink and downlink spectra, some of the radio frequency components can be reused. FIG. 8 is based on FIG. 2b, and like components are omitted from FIG. 8 for clarity.

In this embodiment, separate satellite and terrestrial antennas 31a, 31b are maintained, since although the area of spectrum occupied is the same, the satellite antenna preferably has a higher gain above the horizon whereas the terrestrial antenna will generally be omnidirectional.

A common RF amplifier block 52 comprising a low noise amplifier 54b on the downlink and power amplifier 54a on the uplink is provided, connected switchably to either of the antennas 31a, 31b. The amplifier section 52 is connected to a common up/down converter block 58 consisting of an up converter converting from baseband to RF and a down converter converting from RF to base band with a pair of switchable bandwidths corresponding to those of the satellite communications channels (which are relatively narrow) and terrestrial communications channels (which are relatively broad).

At base band frequency, the signal is then routed between the converter block 58 and the separate codecs etc as discussed in relation to FIG. 2b. Thus, the expensive RF components need not be duplicated, resulting in reduced cost, weight and power consumption. Single mode satellite handsets 2 would omit the CDMA codec portion shown in FIG. 8.

In this embodiment, a special code indicating the frequency channels used and the location of the terrestrial base station is defined for transmission on the broadcast common control channel in each spot beam. When a spot beam overlies a base station 119b, which reuses the satellite frequencies, the code is broadcast. When it is received by any satellite user terminal 2, the user terminal 2 responds by ceasing all uplink transmissions in shared channels by the satellite codec, until a control channel is detected in a satellite downlink spot beam on which the control signal is not being broadcast or the contents of the control signal indicates a different frequency (indicating that the user terminal is now within coverage of a spot beam that does not overlap the terrestrial base stations 119b).

The above described embodiment has the effect of causing all satellite user terminals 2 which can receive the downlink on a beam which overlies one of the base stations 119b to cease to generate satellite signals on the shared frequency channels. However, firstly, since the beam may cover a wider area than the cell surrounding the base station 119b, many satellite user terminals 2 which could otherwise communicate with the satellite without interfering with the terrestrial base station 119 are adversely affected. Secondly, satellite user terminals 2 which cannot receive the signal concerned (for example because of fading or blockage) may nonetheless broadcast on the satellite uplink channel and hence interfere with the terrestrial base station 119.

To resolve the first of these problems, rather than sending a broadcast mode control signal which is to be acted upon by all satellite user terminals 2 within the beam, the position of each satellite user terminal 2 is registered with the data base station 15 (either by incorporating a GPS receiver within each user terminal which reports its data to the satellite periodically, or by using a range and Doppler position sensing technique as described above).

The data base station 15 compares the position of each to data defining the coverage area of each of the base stations 119b, and when a satellite user terminal 2 is detected to be within one of the coverage areas, a control signal of the type discussed above is transmitted specifically to that satellite user terminal on a dedicated control channel therefore, or on a broadcast channel with a user terminal address decodable thereby. Thus, only those terminals which are detected as being likely to interfere cease to be able to use the satellite system.

Alternatively, where the handsets are aware of their own positions (for example each is equipped with a GPS receiver), the control signal may specify the co-ordinates of the coverage area of the base station 119b and each satellite user terminal 2 may be arranged to terminate uplink transmissions on shared frequency channels only if it lies within that coverage area.

To deal with the second problem identified above, in an alternative embodiment, rather than making the satellite user terminals responsive to a control signal broadcast in the downlink from the satellite to cease satellite mode transmissions, the terrestrial base stations 119b which reuse the satellite uplink and downlink are equipped with a transmitter arranged to transmit the control signals.

The satellite codec within each satellite user terminal 2 which can receive transmissions from the base station 119b (and hence might generate uplink transmissions which would interfere with reception by that base station) is arranged, on detecting the control signal, to cease transmissions by the satellite system codec on shared frequency channels.

The control signal might simply be a beacon, broadcast at a predetermined frequency. Alternatively, it might emulate one of the satellite broadcast control channels.

Thus, in this embodiment, with some small modification to the base stations 119b, only those satellite user terminals 2 which are actually within range of the base station 119b are made unable to communicate with the satellite 4 using shared frequency channels, and this is achieved regardless of whether the satellite downlink can be received by them or not. The terrestrial mobile codec of the dual mode terminal 2 in this embodiment (as in the last) does not require modification. This embodiment is effective not only with dual mode satellite terminals sets 2 but also with satellite user terminals which lack a terrestrial mobile codec, because the broadcast signal from the base station 119b is received and acted upon by the satellite system codec.

Finally, rather than modifying the base stations 119b, it is possible instead to modify the terrestrial mobile codecs of dual mode satellite user terminals 2, so that such terminals continuously monitor the downlink for signals from a terrestrial base station 119b. On detection of a CDMA downlink signal, the terrestrial codec sends a control signal to the satellite system codec indicating the detected terrestrial frequencies, to cause the satellite system codec to cease it's transmission on shared channels, and switch to free satellite channels. On loss of signal from the base station 119, after a predetermined time without signal from the base station, the terrestrial system codec issues a control signal to the satellite system codec permitting use once more on the shared channels when necessary.

This embodiment therefore has the advantage that minimal modifications to the terrestrial base stations 119 are required.

It will be seen that this embodiment, in which the satellite uplink spectrum is also available for terrestrial mobile uplink and the satellite downlink spectrum is also available for terrestrial mobile downlink, provides more bandwidth to the terrestrial network for sharing than the preceding embodiment, and enables common RF components to be used in the satellite user terminal 2.

Unlike the preceding embodiment there is also the possibility of interference on the satellite uplink and the terrestrial uplink.

Since satellite uplink channels are on narrow frequency bands, the effect on the broadband terrestrial CDMA uplink channels of any residual satellite uplink transmissions is merely to increase slightly the noise floor experienced.

Third Embodiment

Referring to FIG. 9, in this embodiment, the frequency reuse of the previous embodiment is reversed. That is to say, the satellite uplink is reused by the terrestrial downlink and vice versa. Thus, transmissions in the downlink from the satellite do not affect the terrestrial handsets, but could be received by the terrestrial base stations 119b. Each such base station can, however, be protected from transmission from above by an overlying metal plate, or by suitably designing the antennas to reduce the gain and sidelobes in higher elevation angles and also by pointing the antennas tilted down from the horizontal.

Thus, such shielding or beam shaping, in addition to the shadowing and blockage caused by the deployment of the base stations 119b indoors and in urban areas, substantially reduces the power levels on the satellite downlink reaching the base stations 119b.

For similar reasons, and because the antennas of the base stations 119b are intended to broadcast predominantly in the azimuthal plane, the impact of the terrestrial downlink on the satellite uplink is minimal.

As in the preceding embodiments, the antennas of the base stations may either broadcast preferentially in the azimuthal plane or in all directions other than above the azimuth, so as to reduce the power broadcast towards, and reduce the sensitivity to signals from, the satellite 4.

Although the signals transmitted on the terrestrial and satellite uplink by user terminals are of lower amplitude due to the lower power available in the user terminals, it is noted that the terrestrial uplink signals transmitted by terrestrial handsets could interfere with the satellite downlink signals received by satellite mode handsets, and vice versa, where active terrestrial 112 and satellite mode 2 handsets are close to each other.

Accordingly, in this embodiment, the techniques discussed in the above first and second embodiments in reducing satellite transmissions on the satellite downlink and handset transmissions on the satellite uplink are preferably employed.

Alternatively, each dual mode handset 2 of this embodiment may be arranged to detect CDMA transmission on the terrestrial uplink (i.e. the terrestrial uplink frequency used by other terrestrial handsets)through the satellite receiver . On detection of the frequency of transmissions from a terrestrial handset 112, the satellite system codec is instructed to cease transmissions on any shared frequency channels on the satellite uplink. Thus, where a dual mode terminal 2 is close enough to a terrestrial mode terminal 112 to detect transmission from it (and hence is likely to interfere with it) potentially interfering transmissions from the dual mode handset 2 are terminated.

This embodiment has the advantage that the relatively powerful satellite and terrestrial downlink transmissions are received at the satellite 4 and the base station 119, rather than at the user terminals 2, 112, making interference at the user terminals less likely than interference at the satellite 4 and base station 119. Since it is easier to provide sophisticated interference mitigation and cancellation techniques, of the type described in our earlier applications WO 00/48333, WO 00/49735 or WO 00/35125 for example, at the network side rather than within the user terminals, the effects of any such interference can more easily be mitigated.

Fourth Embodiment

Referring to FIG. 10, in this embodiment, as in the first, the terrestrial uplink and downlink frequency bands both occupy one of the satellite frequency bands. In this embodiment, however, it is the satellite uplink frequency band which is shared. This can be accomplished by placing a frequency gap between the terrestrial uplink and downlink bands, allowing a frequency division duplexer to separate the bands in the handsets and the base stations.

This embodiment is advantageous in situations where many satellite user terminals 2 are connected to data terminal equipment such as personal computers, personal digital assistants or other devices. Typically, such devices are used to download emails; or to download files via the Internet using either file transfer protocol (FTP) or hyper text transfer protocol (i.e. "web browsing").

In such uses, the uplink needs to carry only occasional control and navigation commands specifying files to be downloaded, or acknowledging receipt of data, relative to the heavy usage of the satellite downlink. There is, therefore, considerable scope for reusing the satellite uplink.

As the data rate on satellite uplink channels will be low, they are inherently more immune to the additional noise generated by the wide band CDMA PLMN traffic if each satellite uplink channel is allowed to occupy the same bandwidth as the satellite downlink channel. Alternatively, the satellite uplink channels may be allocated a narrower bandwidth, for example by time division multiplexing a higher number of uplink channels together. The unused uplink channel frequencies thus released are available for terrestrial reuse.

Summary of Interference Modes and Effects

Figure 11:
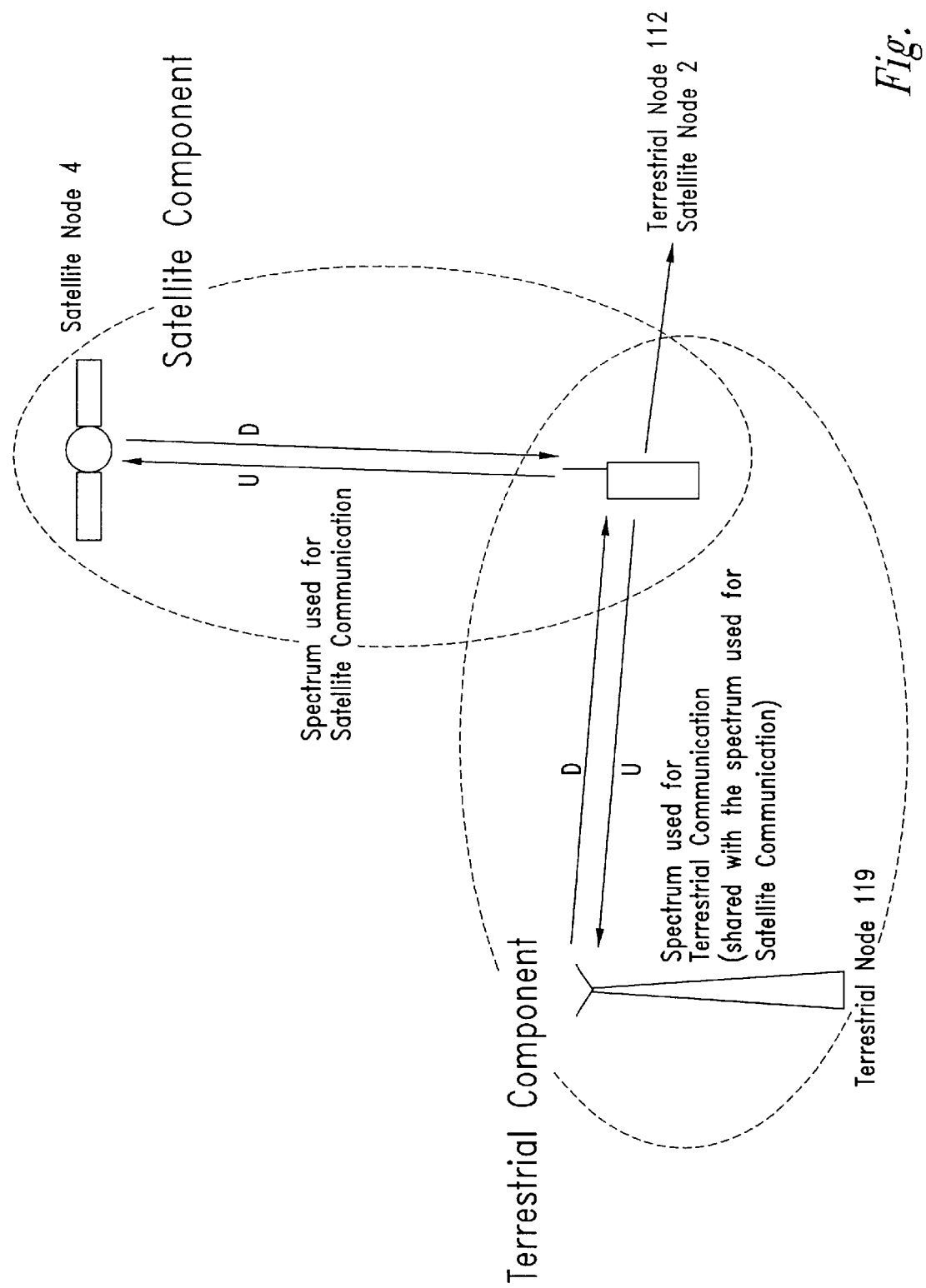
FIG. 11 illustrates the uplinks and downlinks present in the invention.

FIG. 11 shows the satellite and terrestrial uplink and downlinks.

TABLE 1

|  | Interference Modes | | | |
|---|---|---|---|---|
|  | 1st Embodiment | 2nd Embodiment | 3rd Embodiment | 4th Embodiment |
| Satellite into Terrestrial Base | POTENTIAL | | POTENTIAL | |
| Satellite into Terrestrial UT | POTENTIAL | POTENTIAL | | |
| Satellite UT into Terrestrial Base | | POTENTIAL | | POTENTIAL |
| Satellite UT into Terrestrial UT | | | POTENTIAL | POTENTIAL |
| Terrestrial Base into Satellite | | | POTENTIAL | POTENTIAL |
| Terrestrial Base into Satellite UT | POTENTIAL | POTENTIAL | | |

TABLE 1-continued

Interference Modes

| | 1st Embodiment | 2nd Embodiment | 3rd Embodiment | 4th Embodiment |
|---|---|---|---|---|
| Terrestrial UT into Satellite | | POTENTIAL | | POTENTIAL |
| Terrestrial UT into Satellite UT | POTENTIAL | | POTENTIAL | |

Referring to Table 1, the potential modes of interference in each of the above embodiments are briefly discussed, together with the techniques preferred for mitigation thereof. It will be seen that in the first embodiment there is potential interference from the satellite into the terrestrial base station 119 and user terminal 112; and from the terrestrial base station 119 and user terminal 112 into the satellite user terminal 2. In the second embodiment there is potential interference from the satellite 4 into the terrestrial user terminal 112 and vice versa, and from the base station 119 into the satellite user terminal 2 and vice versa.

In the third embodiment there is potential interference from the satellite 4 into the terrestrial base station 119 and vice versa, and from the satellite user terminal 2 into the terrestrial user terminal 112 and vice versa.

In the fourth embodiment there is potential interference in the satellite user terminal 2 into the terrestrial base 119 and user terminal 112, and from the terrestrial base station 119 and user terminal 112 into the satellite 4.

Satellite 4 into Base Station 119

Using representative figures, providing a substantial number of continuous satellite downlink channels (of the order of 40) would increase the noise level, and hence reduce the effective cell size allowable for the terrestrial base station 119 by the order of 60%. To reduce this impact on the PLMN 110, the following measures are proposed:

Providing suitable gain reduction above azimuth (for example by shielding, beam shaping or both) as discussed above can provide up to 25 dB discrimination, halving the reduction in cell size.

As disclosed above, initial allocation by the database station 15 of non-interfering channels to the satellite and terrestrial networks reduces the impact of the interference. Subsequently, shared frequency channels are only allocated up to a predefined limit, which is decided by the amount of interference. Finally, dynamically controlling the number of channels which overlap the PLMN bandwidth which can be allocated to satellite uplinks and downlinks depending on the relative loading of the two networks, further assists in reducing the impact. As most or all satellite terminals 2 will be dual mode, they can also operate on the terrestrial PLMN 110 where needed.

In combination, these techniques greatly mitigate the impact of interference between the terrestrial and satellite systems.

Satellite 4 into Terrestrial Mobile Terminal 112

Using similar figures, it is estimated that up to 40 satellite downlink channels could reduce the effective terrestrial cell size by of the order of 50% where these interfere with the terrestrial downlink.

To mitigate this, as above, the data base station 15 initially preferentially allocates channels to the satellite terminals 2 which do not overlap with the terrestrial spectrum, and dynamically controls the number of satellite channels sharing the spectrum where it is not possible to avoid overlap. The combination of these techniques effectively mitigates potential interference.

Satellite User Terminal 2 into Terrestrial Base Station 119

The radio horizon experienced between the base station antenna and the user terminal will prevent interference from user terminals more than, say, 30 km from the base station. However, within that distance, and to the extent not obstructed by obstacles, user terminals 2 can interfere into the terrestrial base station 119b where the uplink spectra are shared.

To mitigate the interference, firstly, the satellite terminals 2 are made dual mode, and are controlled as described above to operate as terrestrial mobile terminals and consequently to inhibit satellite uplink transmissions while within the coverage of terrestrial base stations 119. This virtually eliminates the interference except where a satellite user terminal 2 is outside the coverage of a base station 119b but close enough to interfere with it, or where the satellite terminal is single mode only.

Secondly, as discussed above, the database station 15 takes advantage of its knowledge of the locations of the base stations 119 and the user terminals 2, to dynamically limit the uplink frequency assignments for user terminals 2 close to a base station 119, to channels which do not overlap the base station receive band. As the maximum interference range is estimated to be around 30 km, different allocations can be made within different parts of each satellite beam.

The combination of these techniques virtually eliminates the potential interference in this mode.

Satellite User Terminal 2 into Terrestrial Mobile Terminal 112

The radio horizon between two handheld terminals is only around 8 km, so that terminals further away from this will not interfere with each other even where the uplink spectra are shared.

To mitigate this interference, the same techniques as in the previous interference mode are operated, with the same results.

Terrestrial Base Station 119 into Satellite 4

As noted above, shadowing substantially reduces the direct line of sight from urban base stations to the satellite. Further, as discussed above, the base station antennas are preferably designed to minimise gain at angles above the horizon, giving up to 25 dB discrimination in the direction of the satellites. Further, the database station 15 initially assigns satellite uplink channels which do not overlap with the base station emission bandwidth for satellite beams which overlap terrestrial base stations 119b; shared channels are only assigned as necessary.

Thirdly, as discussed above, dynamic control of the number of shared channels allocated to satellite uplinks depending on relative loading of the two networks is performed.

Terrestrial Base Station 119 into Satellite User Terminal 2

The interference situation is essentially the reverse of that for satellite user terminal interference into the terrestrial base station, and the same techniques are used to mitigate interference.

Terrestrial Mobile Terminal 112 into Satellite 4

To mitigate this interference, the data base station 15 initially assigns satellite uplink channels which do not overlap with the base station downlink bandwidth in areas where satellite beams overlap cells of base stations 119b; shared channels are only assigned as the satellite or terrestrial systems reach capacity. Secondly, the number of channels shared is dynamically controlled in dependence on the relative loading of the two networks and thereby the interference between both the networks are minimised.

Terrestrial Mobile Terminal 112 into Satellite User Terminal 2

As above, the maximum interference range between the two user terminals is only 8 km. To mitigate interference, firstly, as above, the fact that the satellite terminals 2 are dual mode causes them to operate whenever within range of a base station 119b as terrestrial mobile terminals, which eliminates most of interference except where the terrestrial terminal 112 is in communication with a base station 119b and is within range of a satellite user terminal 2 which is blocked or otherwise prevented from communicating with the terrestrial network 119b.

Secondly, the data base station 15 in conjunction with the MSC 116 dynamically allocates the satellite and terrestrial uplink and downlink frequency assignments for satellite user terminals near a base station 119 to channels that do not overlap each other.

OTHER EMBODIMENTS

It will be clear from the foregoing that the above described embodiments are merely a few ways of putting the invention into effect. Many other alternatives will be apparent to the skilled person and are within the scope of the present invention.

For example, although the above-described embodiments mention base stations sited indoors or in urban areas, and thus make use of the potential shadowing there, it will be clear that the various interference mitigation techniques and spectrum reuse techniques described could also be used with base stations sited additionally or alternatively in suburban or rural areas.

Although in the above embodiments a limit is set on the number of interfering frequencies used, a limit based on other criteria such as the total interfering power (calculated for example taking into account path loss and power used on each channel, and/or other criteria), may instead be used.

Whilst in certain of the above embodiments, frequency duplexing is used to share satellite spectrum between the terrestrial uplink and downlink, time division duplex between the terrestrial uplink and downlink could alternatively be used (as in certain existing terrestrial networks).

It will be clear that other possibilities for reuse by terrestrial networks of the satellite spectrum exist, making use of the above described observations and techniques. Further, the above described techniques may be combined.

Further, it will be clear that each of the above described techniques for reducing the interference between the satellite and terrestrial systems, or for detection techniques to do so, may be employed separately of the others, in other similar interference scenarios.

Whereas in the above described embodiments a dual mode user terminal comprises a common housing and user interface containing separate satellite system and terrestrial codecs, other constructions are possible; for example it could comprise separate single mode terminals interconnected by a wire or a wireless interface.

The CDMA can be third generation wide band CDMA (W-CDMA) or CDMA 2000.

Whereas a TDMA/FDMA satellite system and CDMA terrestrial system are described above, in principle the satellite system could be CDMA and the terrestrial system TDMA/FDMA or FDMA.

The numbers of satellites and satellite orbits indicated are purely exemplary. Smaller numbers of geostationary satellites (for regional coverage), or satellites in higher altitude orbits, could be used; or larger numbers of low earth orbit (LEO) satellites could be used, as disclosed in EP 0365885, or publications relating to the Iridium or Teledesic systems, for example. Equally, different numbers of satellites in intermediate orbits could be used. In principle, even flying platforms such as balloons or aircraft are not excluded.

It will be understood that components of embodiments of the invention may be located in different jurisdictions or in space. For the avoidance of doubt, the scope of the protection of the following claims extends to any part of a telecommunications apparatus or system or any method performed by such a part, which contributes to the performance of the inventive concept.

We claim:

1. A communications system comprising:
   a satellite mobile communications network which comprises a plurality of satellites and a plurality of user terminals communicating on satellite uplink and downlink bands in which said satellite mobile communications network communicates in frequency-divided fashion, using relatively narrow frequency channels within said bands; and
   a terrestrial mobile communications network which comprises a plurality of base stations and a plurality of user terminals communicating on terrestrial uplink and downlink bands in which said terrestrial mobile communications network communicates in code-divided fashion, using relatively wide frequency channels within said bands wherein at least one of the terrestrial bands at least partly reuses at least one of the satellite bands.

2. A system according to claim 1, in which said base stations comprise second base stations reusing said satellite bands, said second base stations being provided only in areas where the path from said satellites to the user terminals will be shadowed.

3. A system according to claim 2, in which said areas are enclosed spaces.

4. A system according to claim 2, in which said areas are urban areas.

5. A system according to claim 1, in which said terrestrial uplink and downlink bands at least partly reuse said satellite downlink band.

6. A system according to claim 5, in which said terrestrial bands do not reuse said satellite uplink band.

7. A system according to claim 1, in which said terrestrial uplink and downlink bands at least partly reuse said satellite uplink band.

8. A system according to claim 7, which said terrestrial bands do not reuse said satellite downlink band.

9. A system according to claim 1, in which said terrestrial uplink band reuses said satellite uplink band, and said terrestrial downlink band reuses said satellite downlink band.

10. A system according to claim 1, in which said terrestrial downlink band reuses said satellite uplink band, and said terrestrial uplink band reuses said satellite downlink band.

11. A system according to claim 1, further comprising a channel allocator allocating channels to be used by at least one of said networks, in dependence upon the frequencies allocated to the other.

12. A system according to claim 11, in which the channel allocator is arranged to control the frequencies allocated to both said networks.

13. A system according to claim 11, in which the channel allocator is arranged to allocate a channel for use by a terminal to communicate with one of said networks initially from a set of frequencies not used by the other said network in the region of the terminal, where such a non-interfering frequency is available.

14. A system according to claim 11, in which the channel allocator is arranged to allocate a channel for use by a terminal to communicate with one of said networks from a set of frequencies also used by the other said network in the region of the terminal, provided that less than a predetermined level of interference is thereby reached.

15. A system according to claim 14, in which said level is determined by a number of said channels.

16. A system according to claim 14, in which, when said level is reached, the channel allocator is arranged to use frequency planning and terminal and network location information to dynamically allocate shared frequency channels.

17. A dual mode user terminal for use in a system according to claim 1.

18. A terminal according to claim 17, in which there is provided a common radio frequency circuit shared by a satellite system control circuit and a terrestrial system control circuit.

19. A terminal according to claim 17, arranged to cease usage of frequencies shared between the satellite and terrestrial systems on detection of predetermined conditions associated with the proximity of said terrestrial mobile communications network, to prevent interference therewith.

20. A terminal according to claim 19, in which the predetermined conditions comprise detection of a control signal transmitted by a said satellite.

21. A terminal according to claim 19, in which the predetermined conditions comprise detection of a signal transmitted by a said base station.

22. A terminal according to claim 19, in which the predetermined conditions comprise detection of a signal transmitted by a user terminal in the terrestrial uplink band.

23. A satellite communications network for use in the system of claim 1.

24. A network according to claim 23, comprising a control station arranged to reduce use of said satellite downlink and/or uplink in regions around one of said base stations.

25. A network according to claim 23, comprising a control device arranged to transmit a control signal to satellite user terminals in regions around one of said base stations to cause said user terminals to reduce use of said satellite uplink.

26. A terrestrial communications network for use in the system of claim 1.

27. A network according to claim 26, comprising a control device arranged to transmit a control signal to satellite user terminals in regions around one of said base stations to cause said user terminals to reduce use of said satellite uplink.

28. A communications system comprising a satellite mobile communications network which comprises a plurality of satellites and a plurality of user terminals communicating on satellite uplink and downlink bands; and a terrestrial mobile communications network which comprises a plurality of base stations and a plurality of user terminals communicating on terrestrial uplink and downlink bands, the system comprising:

a controller to perform frequency planning based on a position of a selected one of the plurality of user terminals wherein the selected user terminal operates in a frequency designated by the controller, the designated frequency being in one of the terrestrial bands that at least partly reuses at least one of the satellite bands.

29. The system of claim 28 wherein at least one of the plurality of base stations calculates the position of the selected user terminal, the controller using the calculated position to perform the frequency planning.

30. A communications system comprising a satellite mobile communications network which comprises a satellite communicating on satellite uplink and downlink bands; and a terrestrial mobile communications network which comprises a base station communicating on terrestrial uplink and downlink bands, the system comprising:

a dual-mode user terminal capable of communicating with the satellite using the satellite uplink and downlink bands and capable of communicating with the base station using the terrestrial uplink and downlink bands, the user terminal communicating on one of the terrestrial bands that at least partly reuses at least one of the satellite bands and comprising:

a controller to detect transmissions between the base station and the satellite on an operational frequency in the satellite uplink and downlink bands, the controller causing the user terminal to cease using the operational frequency for communication with the base station upon detection of the transmission.

31. The system of claim 30 wherein the controller causes the user terminal to switch to a frequency other than the operation frequency upon detection of the transmission.

* * * * *